United States Patent
Liu

(10) Patent No.: US 9,216,307 B2
(45) Date of Patent: Dec. 22, 2015

(54) ANTI-FALLING DEVICE

(71) Applicant: Yi-Pin Liu, Taichung City (TW)

(72) Inventor: Yi-Pin Liu, Taichung City (TW)

(*) Notice: Subject to any disclaimer, the term of this patent is extended or adjusted under 35 U.S.C. 154(b) by 0 days.

(21) Appl. No.: 14/102,580

(22) Filed: Dec. 11, 2013

(65) Prior Publication Data

US 2015/0157885 A1 Jun. 11, 2015

(51) Int. Cl.
*A62B 35/00* (2006.01)
*E04G 21/32* (2006.01)
*F16B 2/12* (2006.01)

(52) U.S. Cl.
CPC ............ *A62B 35/0068* (2013.01); *E04G 21/32* (2013.01); *F16B 2/12* (2013.01)

(58) Field of Classification Search
CPC ........... A62B 35/0068; A62B 35/0037; A62B 35/0081; A62B 1/04; B25B 1/02; B25B 5/02; E04G 21/3276; E04G 5/045; E04G 21/3261; E04G 21/32; E04G 21/3204; E04G 21/3242; F16B 2/12
USPC ...................................................... 248/228.3
See application file for complete search history.

(56) References Cited

U.S. PATENT DOCUMENTS

| | | | | |
|---|---|---|---|---|
| 3,111,912 A | * | 11/1963 | Keiter | 105/141 |
| 3,938,619 A | * | 2/1976 | Kurabayashi et al. | 182/113 |
| 4,052,028 A | * | 10/1977 | Cordero, Jr. | 248/228.1 |
| 4,606,430 A | * | 8/1986 | Roby et al. | 182/3 |
| 5,092,426 A | * | 3/1992 | Rhodes | 182/3 |
| 5,338,016 A | * | 8/1994 | Howard | 269/97 |
| 5,673,888 A | * | 10/1997 | Garguilo | 248/228.3 |
| 5,711,397 A | * | 1/1998 | Flora et al. | 182/3 |
| 5,758,743 A | * | 6/1998 | Coyle et al. | 182/45 |
| 6,016,890 A | * | 1/2000 | Whitmer | 182/36 |
| 6,092,623 A | * | 7/2000 | Collavino | 182/3 |
| D459,839 S | * | 7/2002 | Blackford | D29/124 |
| 6,962,234 B1 | * | 11/2005 | Reeves | 182/36 |
| 7,000,730 B1 | * | 2/2006 | Ostrobrod | 182/36 |
| 8,312,966 B1 | * | 11/2012 | Guthrie et al. | 182/36 |
| 8,646,575 B1 | * | 2/2014 | Guthrie et al. | 182/3 |
| 2001/0011694 A1 | * | 8/2001 | Lycett | 248/228.1 |
| 2006/0272889 A1 | * | 12/2006 | Paquette | 182/3 |
| 2007/0163834 A1 | * | 7/2007 | Casebolt | 182/3 |
| 2010/0006373 A1 | * | 1/2010 | Bodnar | 182/36 |
| 2010/0147624 A1 | * | 6/2010 | Caylor et al. | 182/129 |
| 2010/0326767 A1 | * | 12/2010 | Guthrie et al. | 182/3 |
| 2013/0228394 A1 | * | 9/2013 | Sousa et al. | 182/3 |

FOREIGN PATENT DOCUMENTS

TW    I349727    10/2011

* cited by examiner

*Primary Examiner* — Daniel Cahn
(74) *Attorney, Agent, or Firm* — Alan D. Kamrath; Kamrath IP Lawfirm, P.A.

(57) ABSTRACT

An anti-falling device contains: a support rod including a hanging seat and ratchet teeth; two locking jaws, and each locking jaw having a fixing mount, a controlling member, and a spring; the fixing mount having a fitting orifice, an arcuate orifice, a receiving orifice, and a clamping hook. The fitting orifice is fitted with the support rod, the arcuate orifice passes through the fixing mount, the receiving orifice passes through the fixing mount, two clamping hooks of the two locking jaws are clamped on two end portions of an extending plate of a H beam. The controlling member is connected with the fixing mount and swings between a locking position and an unlocking position. The controlling member has a lock bolt and two apertures, and the two inserting bolts are inserted into the two apertures and the receiving orifice so as to limit the controlling member at the locking position.

10 Claims, 7 Drawing Sheets

ANTI-FALLING DEVICE

FIELD OF THE INVENTION

The present invention relates to an anti-falling device which is operated easily and safely.

BACKGROUND OF THE INVENTION

A conventional anti-falling device is disclosed in TW Publication No. I349727 and contains a support rod having a plurality of ratchet teeth defined thereon, a hanging seat for hanging a safety rope on a worker, and two locking jaws fitted thereon. Each locking jaw has a movable clamper and a controlling member disposed on the movable clamper. The controlling member has a single-direction toothed member driven by a spring to engage with the plurality of ratchet teeth, such that the locking jaw move to each other along the support rod. The single-direction toothed member of the controlling member engages with and disengages from the plurality of ratchet teeth. When the two locking jaws inversely move along the support rod, the single-direction toothed member are engaged by the plurality of ratchet teeth, and then two controlling members drive the single-direction toothed member to disengage from the plurality of ratchet teeth, such that the two locking jaws move inversely along the support rod so as to retain a H beam.

However, when the two controlling members are pressed carelessly, the single-direction toothed member is driven to disengage from the plurality of ratchet teeth, thus operating the anti-falling device unsafely.

The present invention has arisen to mitigate and/or obviate the afore-described disadvantages.

SUMMARY OF THE INVENTION

The primary object of the present invention is to provide an anti-falling device which is operated easily and safely To obtain the above objective, an anti-falling device provided by the present invention contains: a support rod, two locking jaws, and two inserting bolts.

The support rod includes a hanging seat for coupling with a safety rope on a worker; the support rod also includes a plurality of ratchet teeth defined thereon.

The two locking jaws are fitted on two ends of the support rod, and each locking jaw has a fixing mount, a controlling member, and a spring. The fixing mount has a fitting orifice, an arcuate orifice, a receiving orifice, and a clamping hook. The fitting orifice is polygonal and fitted with the support rod, the arcuate orifice passes through the fixing mount and communicates with the fitting orifice, the receiving orifice passes through two sides of the fixing mount adjacent to a top end thereof, two clamping hooks of the two locking jaws are clamped on two end portions of an extending plate of a H beam, the controlling member is connected with the fixing mount and swings between a locking position and an unlocking position, the controlling member has a lock bolt inserted into the arcuate orifice and two apertures, when the controlling member is located at the locking position, the lock bolt engages with one of the plurality of ratchet teeth, and the two apertures align with the receiving orifice; when the controlling member is located at an unlocking position, the lock bolt disengages from one of the plurality of ratchet teeth, and the spring is defined between the fixing mount and the controlling member so as to push the controlling member to fix at the locking position, and after two inserting bolts are removed from the two apertures and the receiving orifice, they push the two locking jaws to move to each other, such that the lock bolt engages with one of the plurality of ratchet teeth.

The two inserting bolts are inserted into the two apertures and the receiving orifice so as to limit the controlling member at the locking position.

DETAILED DESCRIPTION OF THE PREFERRED EMBODIMENTS

Figure 1:
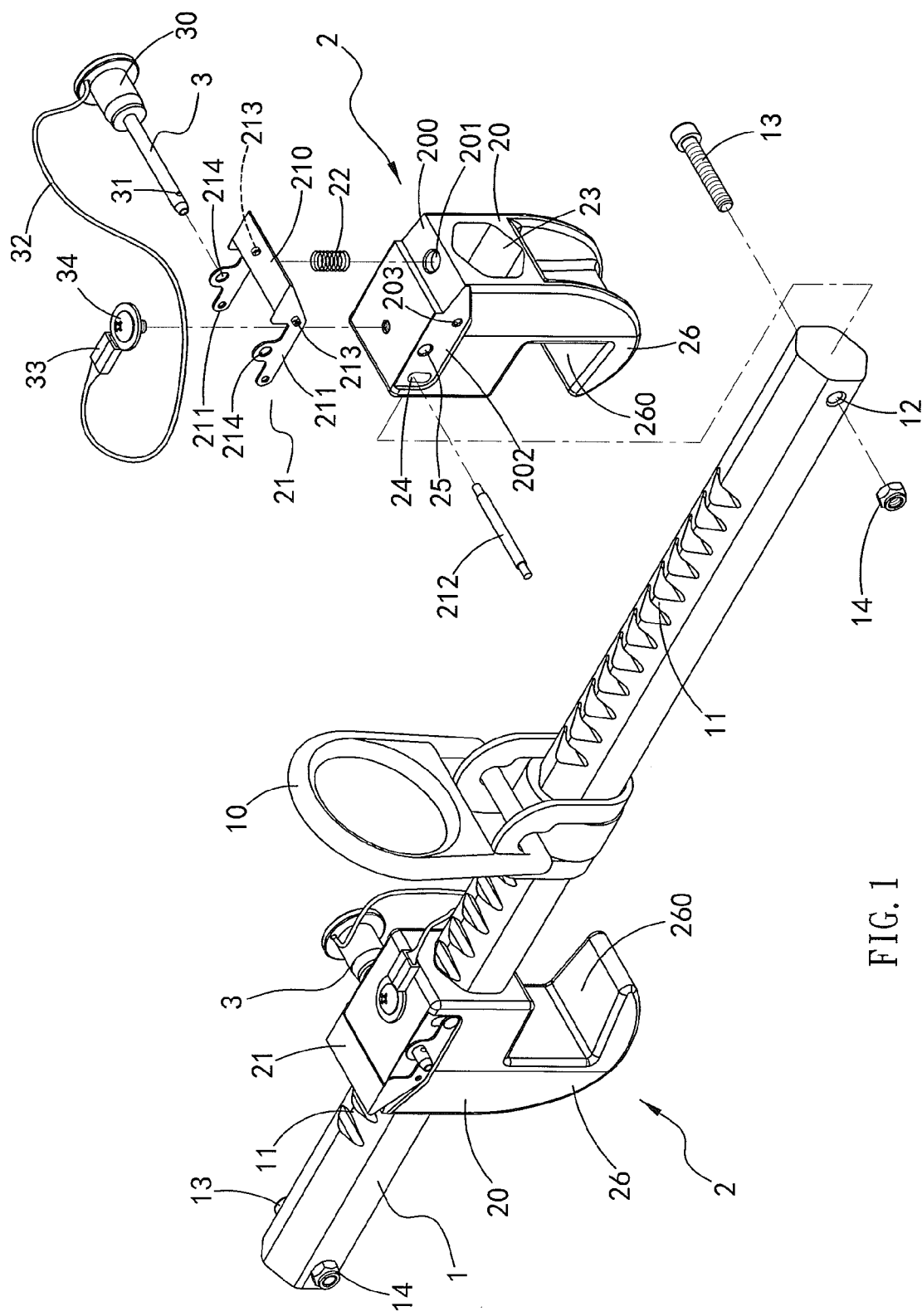
FIG. 1 is a perspective view showing the exploded components of an anti-falling device according to a first embodiment of the present invention.
Figure 2:
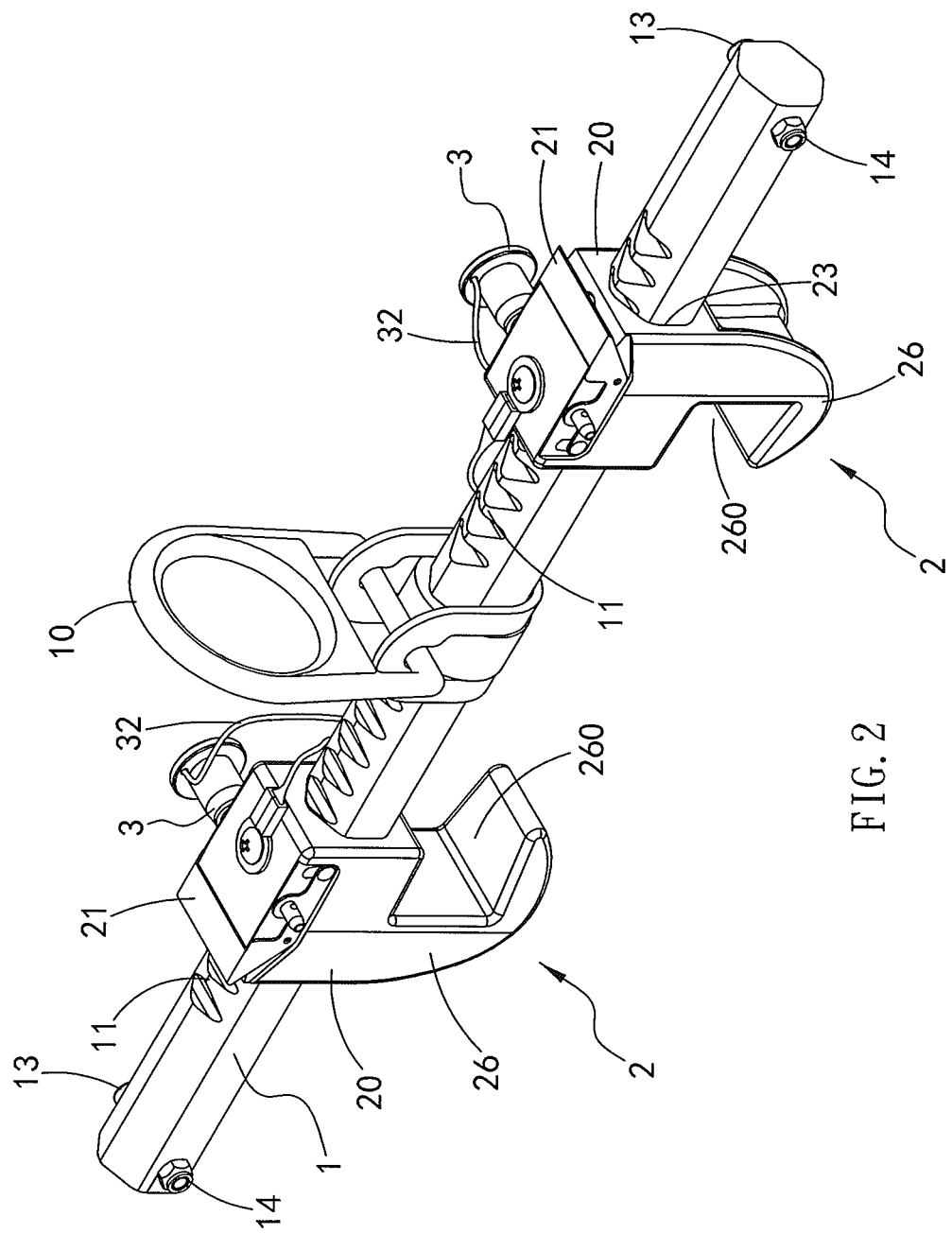
FIG. 2 is a perspective view showing the assembly of the anti-falling device according to the first embodiment of the present invention.

With reference to FIGS. 1-6, an anti-falling device according to a first embodiment of the present invention comprises: a support rod 1, two locking jaws 2, and two inserting bolts 3.

The support rod is hexagonal and includes a hanging seat 10 for coupling with a safety rope 50 on a worker 5. The support rod 1 also includes a plurality of ratchet teeth 11 defined thereon, two through holes 12 passing through two ends thereof so as to insert two screw bolts 13, and then the two screw bolts 13 are screwed with two nuts 14.

The two locking jaws 2 are fitted on the two ends of the support rod 1, and each locking jaw 2 has a fixing mount 20, a controlling member 21, and a spring 22. The fixing mount 20 has a fitting orifice 23, an arcuate orifice 24, a receiving orifice 25, and a clamping hook 26. The fitting orifice 23 is polygonal and is fitted with the support rod 1, such that the fixing mount 20 axially moves along the support rod 1. The arcuate orifice 24 passes through the fixing mount 20 and communicates with the fitting orifice 23. The receiving orifice 25 passes through two sides of the fixing mount 20 adjacent to a top end thereof. The clamping hook 26 has a lock groove 260 defined thereon, such that two clamping hooks 26 of the two locking jaws 2 are clamped on two end portions of an extending plate 40 of a H beam 4. The fixing mount 20 also has a tilted face 200 defined on an outer rim of a top surface thereof, a spring slot 201 formed on the tilted face 200, two recesses 202 arranged on two opposite sides thereof, two notches 203 defined in the two recesses 202. The controlling member 21 is connected with the fixing mount 20 and swings between a locking position and an unlocking position. The controlling member 21 has a pressing piece 210, two side sheets 211, and a lock bolt 212. The pressing piece 210 is disposed on the tilted face 200, and the two side sheets 211 extend to the two recesses 202 from the two pressing pieces 210, the two side sheets 211 have two pegs 213 inserted into the two notches 293 and two apertures 214 for aligning with the receiving orifice 25. The lock bolt 212 is inserted into the arcuate orifice 24 and has two ends coupling with the two side sheets 211. The spring 22 is mounted in the spring slot 201 and has an upper end for abutting against a bottom end of the pressing piece 210 so as to push the controlling member 21 to fix at the locking position.

The two inserting bolts 3 are inserted into the two apertures 214 and the receiving orifice 25, such that the controlling member 21 is limited at the locking position. Each inserting bolt 3 has a large-diameter head 30 and a small-diameter stem 31 inserting through the two apertures 214 and the receiving orifice 25. The large-diameter head 30 is fixed on a first end of a hanging rope 32, and a positioning element 33 is secured on a second end of the hanging rope 32 and is screwed on the top surface of the fixing mount 20 by a screw 34.

Figure 3:
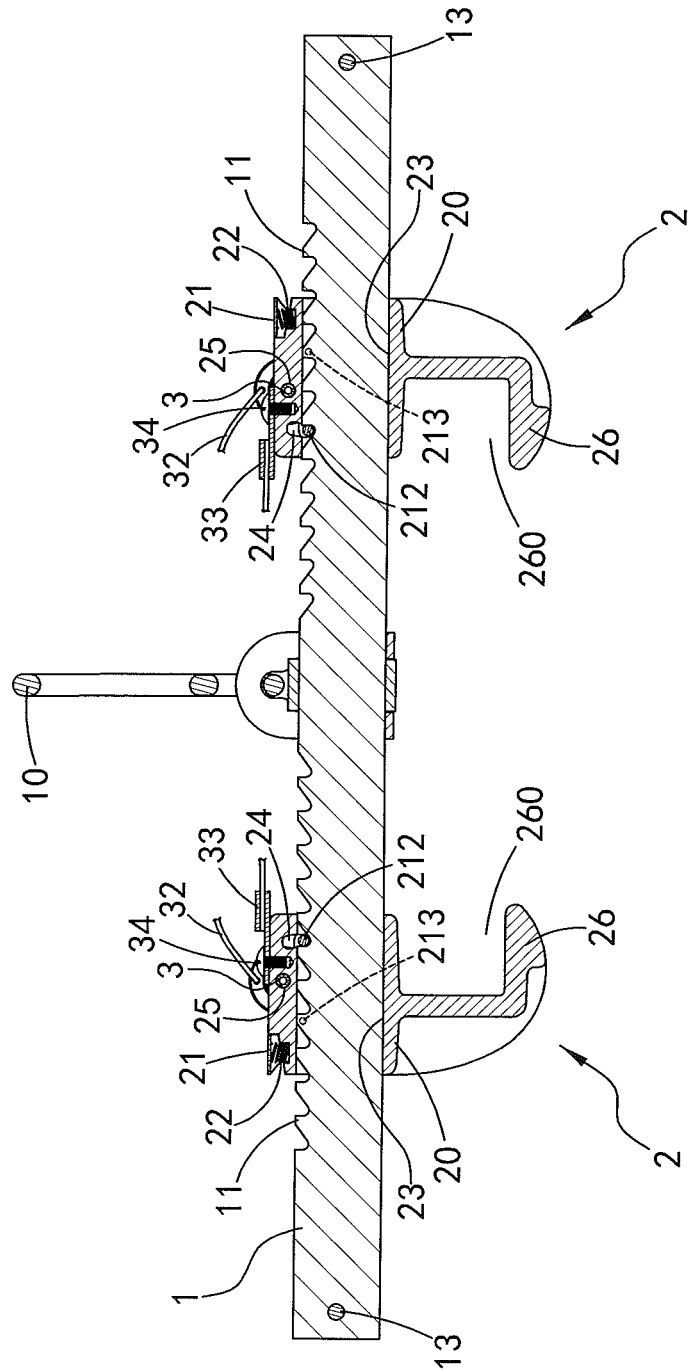
FIG. 3 is a cross sectional view showing the assembly of the anti-falling device according to the first embodiment of the present invention.

Referring to FIGS. 1 and 3, the spring 22 pushes the controlling member 21 to fix at the locking position, and when the controlling member 21 is located at the locking position, the lock bolt 212 engages with one of the plurality of ratchet teeth 11, and the two apertures 214 align with the receiving orifice 25, such that the two inserting bolts 3 are inserted into the two apertures 214 and the receiving orifice 25 so as to limit the controlling member 21 at the locking position.

Figure 4:
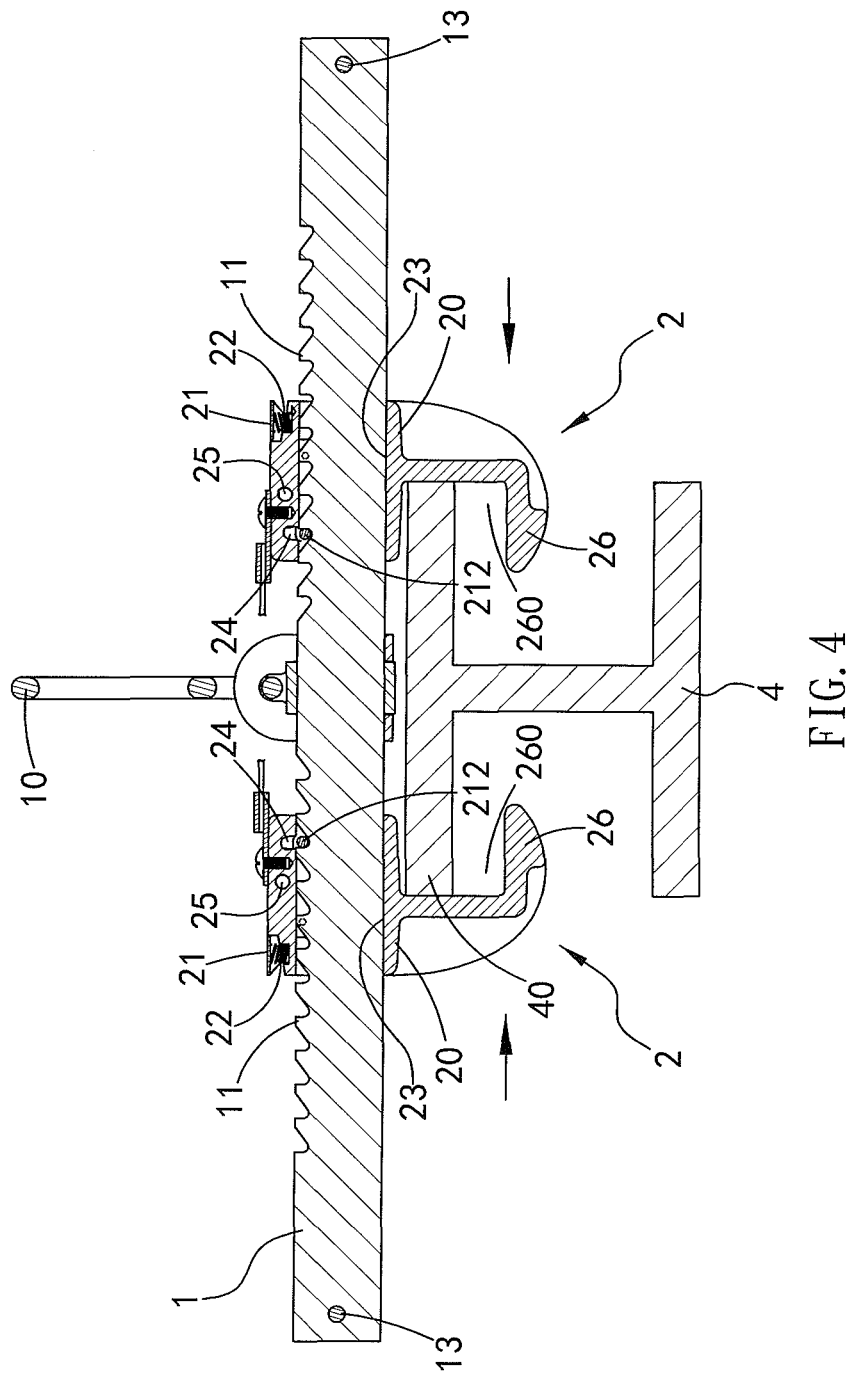
FIG. 4 is a cross sectional view showing the operation of the anti-falling device according to the first embodiment of the present invention.
Figure 5:
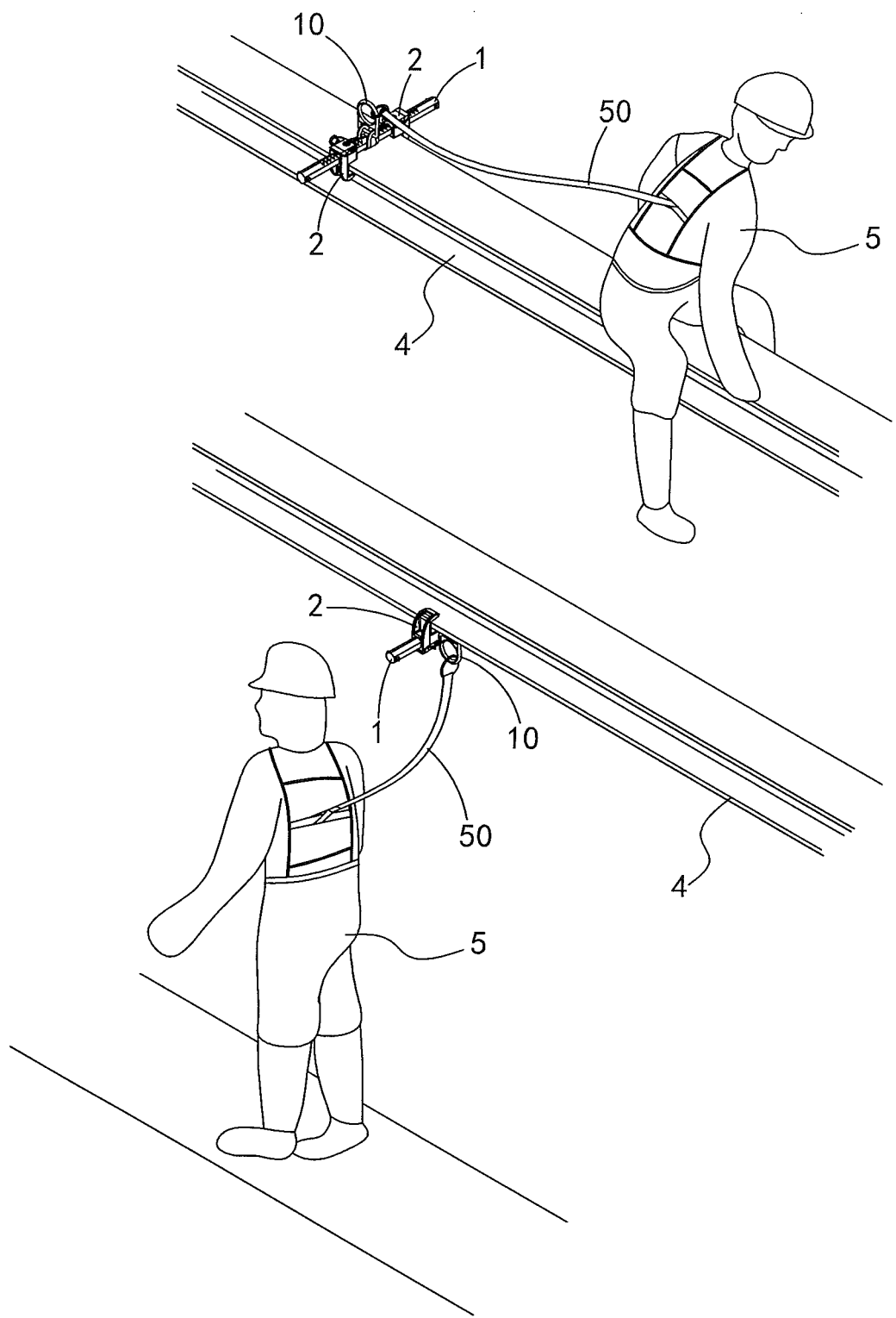
FIG. 5 is a perspective view showing the application of the anti-falling device according to the first embodiment of the present invention.

As shown in FIGS. 1, 4 and 5, when the two inserting bolts 3 are removed from the two apertures 214 and the receiving orifice 25, the two locking jaws 2 are pushed so that two lock bolts 212 are driven to engage with two of the plurality of ratchet teeth 11, thus positioning the two locking jaws 2. Thereafter, the two locking jaws 2 clamp the H beam 4, and the safety rope 50 on the worker 5 is coupled with the hanging seat 10, hence when the worker 5 moves on the H beam 4, the safety rope 50 drives the anti-falling device to slide along the H beam 4. In addition, the two locking jaws 2 clamp the H beam 4 so as to protect the worker 5 from falling.

Figure 6:
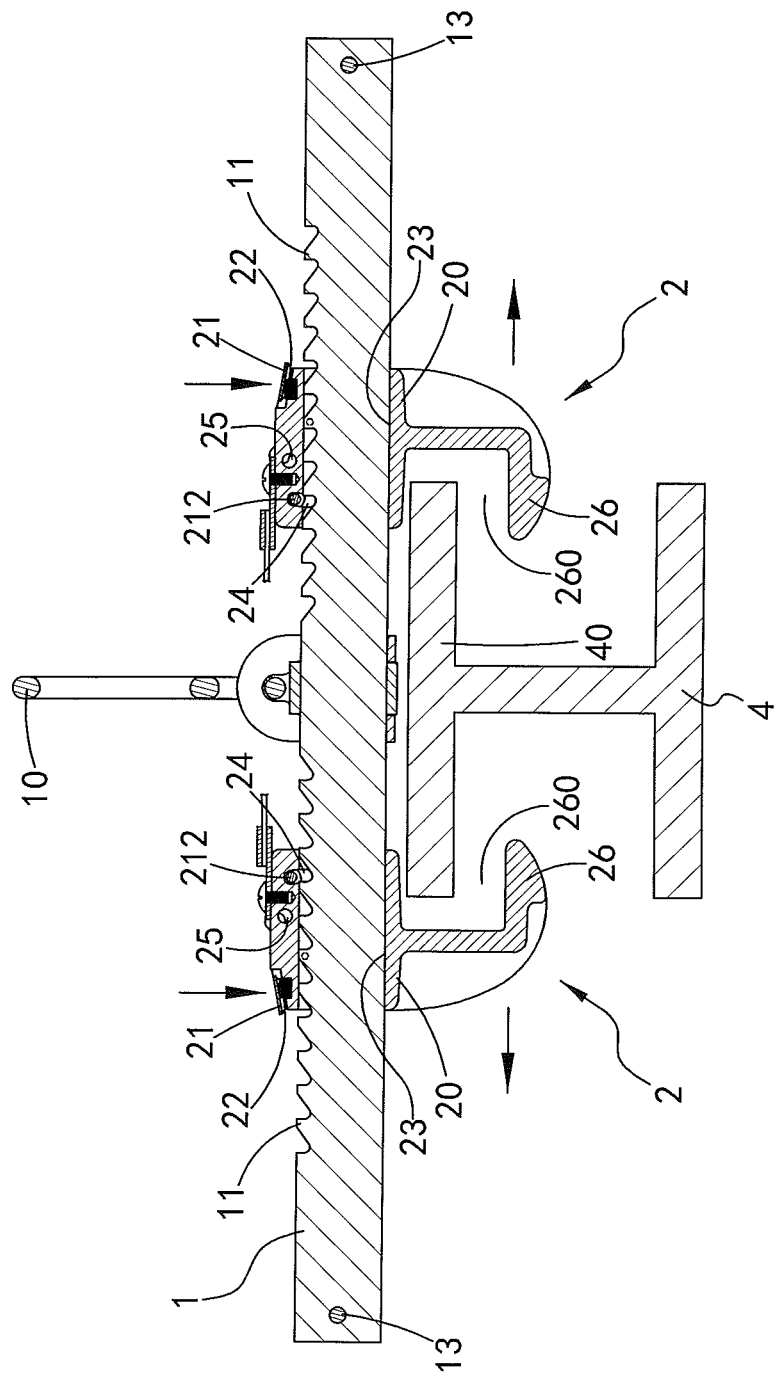
FIG. 6 is another cross sectional view showing the operation of the anti-falling device according to the first embodiment of the present invention.

As illustrated in FIGS. 1 and 6, after the two inserting bolts 3 are removed from the two apertures 214 and the receiving orifice 25, the controlling member 21 is pressed to swing toward an unlocking position, such that the two lock bolts 212 disengage from two of the plurality of ratchet teeth 11, and the two apertures 214 do not align with the receiving orifice 25 so that the two locking jaws 2 are pushed outwardly from the H beam, thus unclamping the H beam 4.

Accordingly, the two locking jaws 2 are adjustably clamp the H beam 4 of varying size. Also, the two screw bolts 13 and the two nuts 14 are provided to prevent the two locking jaws 2 from disengagement from the two ends of the support rod 1.

Figure 7:
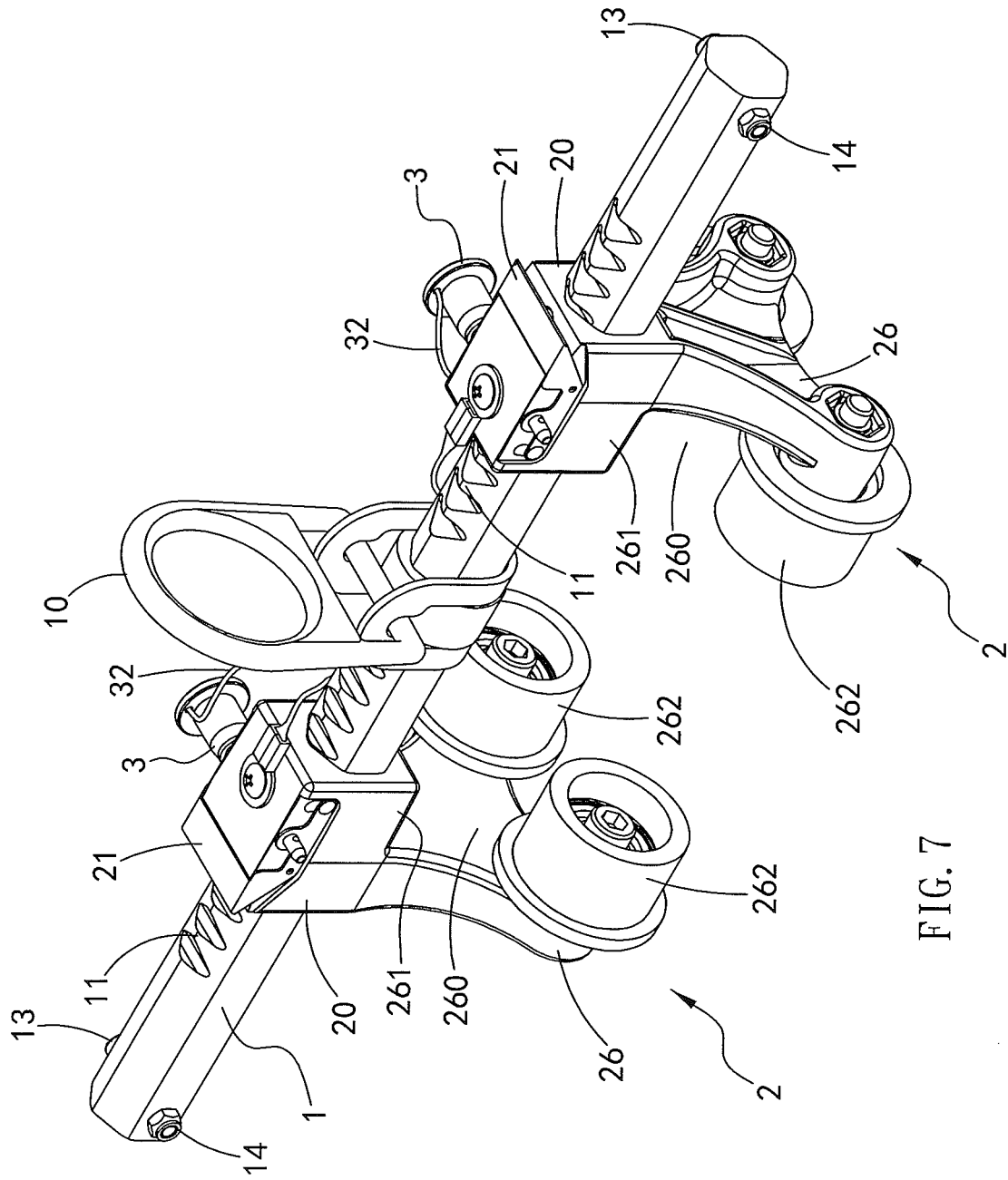
FIG. 7 is a perspective view showing the assembly of the anti-falling device according to a second embodiment of the present invention.

With reference to FIG. 7, a difference of an anti-falling device of a second embodiment from that of the first embodiment comprises: two locking jaws 2 including two clamping hooks 26, and each clamping hook 26 having a protrusion 261 and two rollers 262, a lock groove 260 defined among the protrusion 261 and the two rollers 262, such that the lock groove 260 retains with two end portions of an extending plate 40 of a H beam 4, and the two rollers 262 of the two locking jaws 2 roll the anti-falling device on the H beam 4 smoothly.

Due to the two inserting bolts 3 are inserted into the two apertures 214 and the receiving orifice 25 of the two locking jaws 2, the controlling member 21 is limited at the locking position, such that the controlling member 21 will not be pressed carelessly to drive the lock bolt 212 to disengage from one of the plurality of ratchet teeth, thus avoiding the two locking jaws 2 unclamping the H beam 4 along the support rod 1. Furthermore, after the two inserting bolts 3 are removed from the two apertures 214 and the receiving orifice 25, they push the two locking jaws 2 to move to each other, such that the lock bolt 212 engages with one of the plurality of ratchet teeth 11, thereby clamping the H beam 4. After removing the two inserting bolts 3 from the two apertures 214 and the receiving orifice 25, the controlling member 21 is pressed to swing toward the unlocking position so that the lock bolt 212 disengages from one of the plurality of ratchet teeth 11, thereby unclamping the H beam 4 easily and quickly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An anti-falling device comprising:
a support rod including a hanging seat configured to couple with a safety rope on a worker, the support rod also including a plurality of ratchet teeth defined therein; two locking jaws fitted on two opposing ends of the support rod, and each locking jaw of said two locking jaws having a fixing mount, a controlling member, an inserting bolt and a spring; the fixing mount having a fitting orifice, an elongated arcuate orifice, a receiving orifice, and a clamping hook; the fitting orifice being polygonal and fitted with the support rod which passes through the fitting orifice, the elongated arcuate orifice passing through the fixing mount and communicating with the fitting orifice, the receiving orifice passing through two sides of the fixing mount adjacent to a top end thereof, the two clamping hooks of the two locking jaws being clamped on two end portions of an extending plate of an H beam, the controlling member being pivotally connected with respect to the fixing mount, the controlling member configured to pivot between a locked position and an unlocked position, the controlling member having a lock bolt inserted into the elongated arcuate orifice and having two apertures; when the controlling member is located in the locked position, the lock bolt engages with one of the plurality of ratchet teeth, and the two apertures linearly align with the receiving orifice in order to receive the inserting bolt; when the controlling member is in the locked position as the inserting bolt is inserted into the two apertures and the receiving orifice, the controlling member is prevented from pivoting and the fixing mount is prevented from moving in opposing directions along the support rod; when the inserting bolt is removed from the two apertures and the receiving orifice, and the controlling member is pivoted from the locked position to the unlocked position, the controlling member is pushed against the bias of the spring so that the lock bolt disengages from said one of the plurality of ratchet teeth and the fixing mount is allowed to move in the opposing directions along the support rod.

2. The anti-falling device as claimed in claim 1, wherein the fixing mount also has a tilted face defined on an outer rim of a top surface thereof and a spring slot formed on the tilted face; the controlling member has two side sheets extending from a pressing piece, the pressing piece is disposed near the tilted face, the lock bolt has two ends coupling with the two side sheets, the two apertures are defined on the two side sheets, and the spring is mounted in the spring slot and has an upper end for abutting against a bottom end of the pressing piece.

3. The anti-falling device as claimed in claim 2, wherein the fixing mount also has two notches defined in two recesses, and the two side sheets have two pegs inserted into the two notches.

4. The anti-falling device as claimed in claim 2, wherein the fixing mount also has two recesses arranged on two opposite sides thereof.

5. The anti-falling device as claimed in claim 1, wherein each inserting bolt has a head and a stem inserting through the two apertures and the receiving orifice, the head is fixed on a first end of a hanging rope, and a second end of the hanging rope is secured on the fixing mount, wherein a diameter of the head of each inserting bolt is greater than that of the stem of each inserting bolt.

6. The anti-falling device as claimed in claim 5, wherein a positioning element is secured on the second end of the hanging rope, and the positioning element is screwed on the fixing mount by a screw.

7. The anti-falling device as claimed in claim 1, wherein the support rod also includes two through holes passing through the two opposing ends in order to insert two screw bolts secured by two nuts.

8. The anti-falling device as claimed in claim 1, wherein the support rod is hexagonal so as to fit with the fitting orifice.

9. The anti-falling device as claimed in claim 1, wherein each of the clamping hooks has a lock groove defined thereon.

10. The anti-falling device as claimed in claim 1, wherein each one of the clamping hooks has two rollers.

* * * * *